United States Patent

[11] 3,568,035

[72] Inventor Alexandre Pierson
 Biviers, France
[21] Appl. No 808,222
[22] Filed Mar. 18, 1969
[45] Patented Mar. 2, 1971
[73] Assignee Commissariat A L'Energie Atomique
 Paris, France
[32] Priority Mar. 20, 1968
[33] France
[31] 144,633

[54] DEVICE FOR THE PRODUCTION OF A HIGH DIRECT VOLTAGE DIFFERENCE
 12 Claims, 11 Drawing Figs.
[52] U.S. Cl. .................................................. 321/15,
 336/175, 323/48
[51] Int. Cl. .................................................. H02m 7/00
[50] Field of Search ........................................... 321/15, 27;
 323/48; 336/175

[56] References Cited
UNITED STATES PATENTS

| | | | |
|---|---|---|---|
| 2,600,057 | 6/1952 | Kerns | 323/48X |
| 3,243,683 | 3/1966 | Ackley | 321/15X |
| 3,363,165 | 1/1968 | Wilkinson | 323/48X |
| 3,368,137 | 2/1968 | Kennard et al. | 336/175X |
| 3,419,786 | 12/1968 | Brane | 321/27 |

Primary Examiner—William M. Shoop, Jr.
Attorney—Cameron, Kerkam & Sutton

ABSTRACT: A transfer coil consisting of a loop provided with a sufficient electrical insulation is fed by an AC source and is inductively coupled with a plurality of cells. Each cell consists of a winding coupled with the loop and a rectifier circuit fed by the winding. The outputs of all rectifiers are in series aiding relation.

In a first embodiment the loop is closed and inductively coupled to the source, making it possible to connect it to half the high voltage. In another embodiment, the loop ends are connected to a winding inductively coupled with the source and the loop is at the source DC potential.

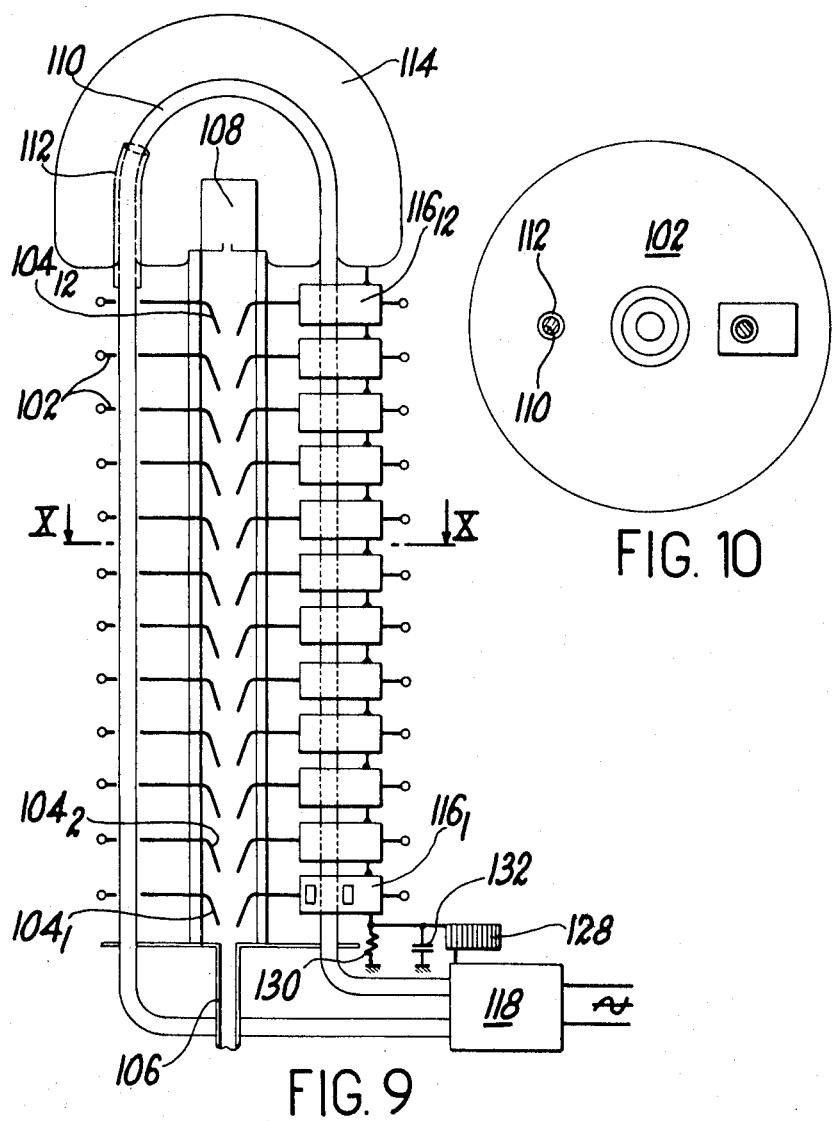
FIG. 10
FIG. 9
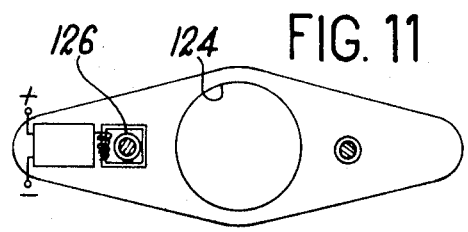
FIG. 11

3,568,035

DEVICE FOR THE PRODUCTION OF A HIGH DIRECT VOLTAGE DIFFERENCE

The invention is directed to a device which employs an alternating current source to produce a high direct current potential difference of the order of several hundred kilovolts or more and which can be associated with an insulating transformer for transmitting an electric power from one potential level to the other.

The problem of production of high direct current potential differences is encountered in many fields, in particular in the field of particle accelerators and radiation generators which utilize the impact of charged particles on a suitable target. The means employed up to the present time for producing the necessary high values of direct current voltage have usually consisted either of Van de Graaf Generators or of devices which make use of a voltage step-up transformer coupled with a rectifier of the type which produces voltage multiplication. The first type which produces voltage multiplication. The first type of generator provides satisfactory operation but nevertheless suffers from a number of different disadvantages and in particular that of being extremely bulky, of delivering only very low currents (a few hundred microamperes at a maximum) and of being ill-suited for use in devices which produce stepped potential differences from standard cells. The second type of generator either entails a complex design each time it proves necessary to make use of a large number of cascaded voltage-multiplication stages or else imposes very stringent operating conditions on the step-up transformer if a high potential difference is to obtained from a small number of cascaded voltage-multiplication stages. The aim of this invention is to provide a device for the production of high direct current potential differences which conform to practical requirements more effectively than comparable devices which have been proposed heretofore, especially insofar as it circumvents the disadvantages referred to above.

To this end, the invention proposes a device for the production of a high direct current potential difference from an alternating current source wherein said device comprises: a transfer winding supplied from said source and preferably consisting of a single conductive loop and a plurality of cells each comprising a secondary winding inductively coupled to said transfer winding and a rectifier circuit supplied by said secondary winding, the outputs of the rectifiers of said cells being placed in series so as to apply to the terminals of all the rectifiers a potential difference which is equal to the sum of potential differences supplied by the cells.

The advantages provided by this device are immediately apparent: it is made up of identical cells and it is merely necessary either to increase or to reduce the number of cells in order to modify the available potential difference, not only is it possible to obtain the requisite direct current potential difference from a same transfer winding but also to transmit a power to one or a number of load circuits by inductively coupling these latter also to the transfer winding and to bring these circuits to a mean direct current potential equal to any one of the potentials along the chain of cells by coupling to the output of the appropriate cell. Finally, there are disposed along the chain which is constituted by the cells a large number of points at intermediate potentials to which particular appliances can be connected.

A clearer understanding of the invention will be gained from the following description of embodiments which are given by way on nonlimitative example, reference being made to the accompanying drawings, wherein:

FIGS. 9 and 10 are schematic views taken respectively in longitudinal section and in transverse section along the line X–X of FIG 9 and showing a particle accelerator in which the invention is carried into practice;

FIG 11 which is similar to FIG 10 illustrates another embodiment of the invention.

Figure 1:
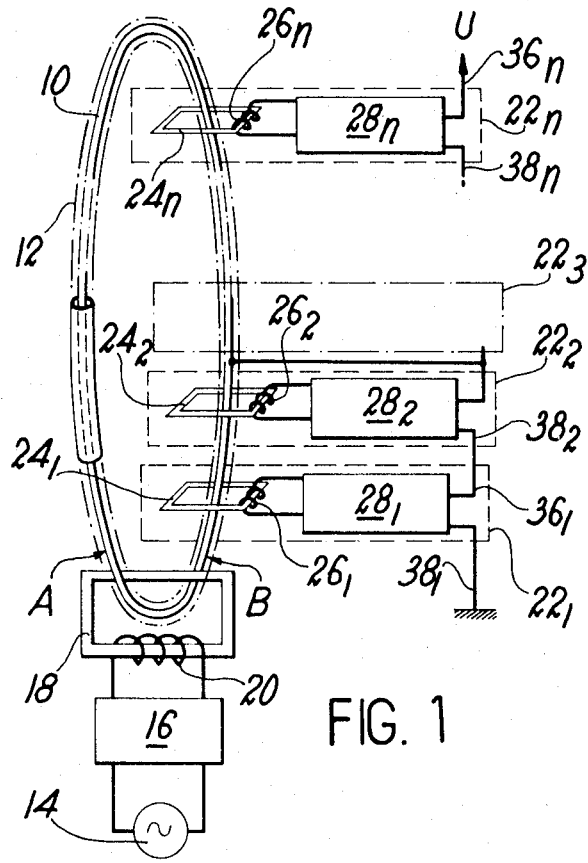
FIG 1 is a schematic diagram of one embodiment of the invention as defined in a very general form.

The device which is illustrated in FIG 1 is intended to produce a high direct current potential difference from a low-tension single-phase alternating current supply. The device comprises a transfer winding 10 consisting of a single electrically conductive loop of elongated shape. Said loop may be formed by a solid or hollow copper rod or cable, for example, which is covered with an electrically insulating sheath 12, only a portion of which is shown diagrammatically in the FIG. Said insulating sheath can consist of a tube of polyethylene or quartz which is in contact with the loop or separated from this latter by a liquid, a gas or a free space. In cables of this type which are commercially available at the present time (e.g. the cable which is marketed under the reference PT 300 by the French company known as "Les cables de Lyon"), the insulating sheath is designed to withstand a potential difference of several hundred kilovolts.

A low-tension alternating current source 14 supplies current to the transfer winding 10. In the embodiment which is illustrated diagrammatically in FIG 1, the source 14 supplies a frequency converter 16 which is in turn inductively couples to the transfer winding 10. The design function of the frequency converter is to rise from the frequency of the source 14 (usually the main supply frequency, namely 50 or 60 c/s) to a much higher frequency (500 c/s, for example) and to increase the cos of the circuit. Frequency converters of this type which make use of thyristors, for example, are at present in existence and exhibit satisfactory efficiency. It need scarcely be added that if very high frequencies such as 2,000 c/s are employed, it becomes necessary in that case to fabricate the magnetic circuits from low-loss materials such as the ferrites.

In the embodiment which is illustrated in FIG 1, the frequency converted 16 is inductively coupled to the transfer winding 10 by means of a closed magnetic circuit 18 which completely surrounds the winding 10 and on which is wound a primary winding 20 supplied by the converter 16. Other modes of supply of the transfer winding 10 can be employed: in particular, the source 14 can be coupled directly to the extremities A and B of the loop which is then no longer completely closed.

Figure 2:
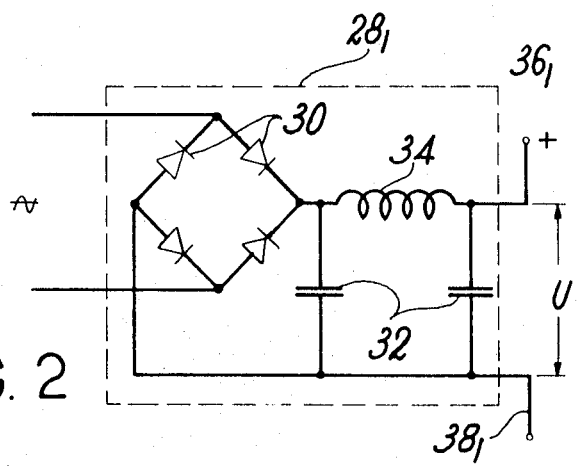
FIG 2 is a diagram of a rectifier with which each cell of the device of FIG 1 can be equipped.

The transfer winding 10 is inductively coupled to a plurality of identical cells $22_1$, $22_2$ ... $22_n$. The cell $22_1$ is inductively coupled to the winding 10 by means of a closed magnetic circuit $24_1$ which completely surrounds the winding so as to reduce magnetic losses. Said magnetic circuit carries a secondary winding $26_1$ which supplies a rectifying and filtering circuit $28_1$. This circuit can be as shown by way of example in FIG 2 and comprises a bridge rectifier 30 with four diodes followed by an H filter made up of two capacitors 32 and an inductance coil 34.

The negative output $38_1$ of the cell $22_1$ is connected to ground whilst the positive output $36_1$ is connected to the negative output $38_2$ of the following cell $22_2$. The cells $22_2$, $22_3$, .... $22_n$ are all mounted in the same manner so that there accordingly exists between ground and the output $36_n$ a voltage difference $U = nu$ where $u$ is the direct current potential difference between the outputs of one cell.

In the embodiment which is illustrated in FIG 1, the loop which constitutes the transfer winding 10 is brought to a direct current potential with respect to ground which is equal to $+2u$ since it is connected to the positive output of the cell $22_2$. In general, it will prove advantageous to connect the loop to the output of a cell which is chosen so that the potential at that point is as close as possible to U/2. In that case, the insulating sheath 12 of the transfer winding 10 is subjected only to one-half the total potential difference. For example, if the device is intended to provide a potential difference of 500 kv., the loop will preferably be brought to a potential of 250 kv.

Instead of a voltage rectifier of the type shown in FIG 1, it would evidently be possible to employ a voltage-multiplication circuit of conventional type followed by a filter.

Figure 3:
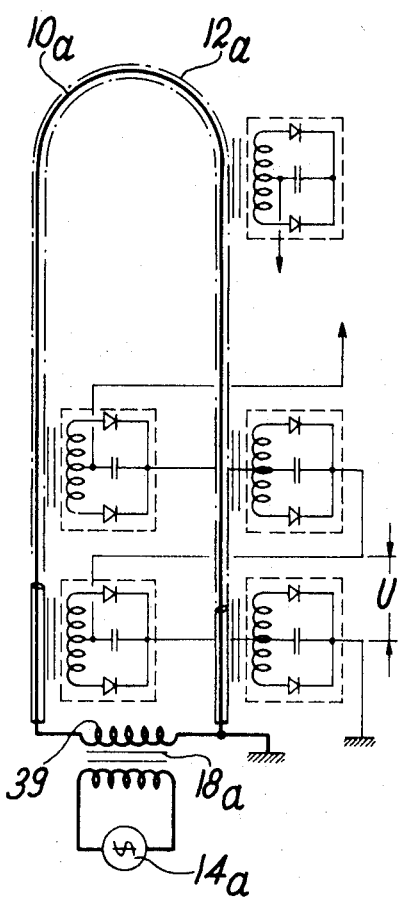
FIGS. 3 and 4 are schematic diagrams of alternative forms of the device which is illustrated in FIG 1.

The general arrangement which is illustrated in FIG 1 permits of many variants. In particular, half-cells can be disposed alternately on one side and on the other of the elongated loop which constitutes the transfer winding $10_A$ as illustrated in FIG 3: This circuit arrangement provides a number of advantages. It permits the possibility of distributing the voltage of each cell between two secondary windings so that each winding carries only one-half of the potential difference $U$. An appreciable saving of space is thus achieved in respect of a given power. Finally, a better coupling is achieved between the loop and all the magnetic circuits and this has the effect of reducing losses still further.

The device which is illustrated in FIG 3 again differs from the device of FIG 1 in the mode of coupling of the loop with the supply. The loop 10 of FIG 1 is completely closed and surrounded by the magnetic circuit 18. In practice, this arrangement makes it necessary to adopt for the section of the magnetic circuit 18 a value of the same order as the sum of the sections of the magnetic circuits $24_1, 24_2, .... 24_n$, that is to say if it is sought to have a high RMS value of alternating current voltage at the terminals of the windings $26_1, 26_2, .... 26_n$. On the contrary, the loop 10a of FIG 3 is closed across a coupling winding 39 so that the magnetic circuit 18a no longer has to satisfy the condition mentioned above. On the other hand, the loop must be brought to the direct current potential of the source 14a, thereby making it necessary for the insulating sheath 12a to withstand the voltage $U$: in fact, the winding 39 can only be formed of flexible wire and therefore has an insulating sheath which is too thin to withstand the voltage $U$ or even $U/2$.

Figure 4:
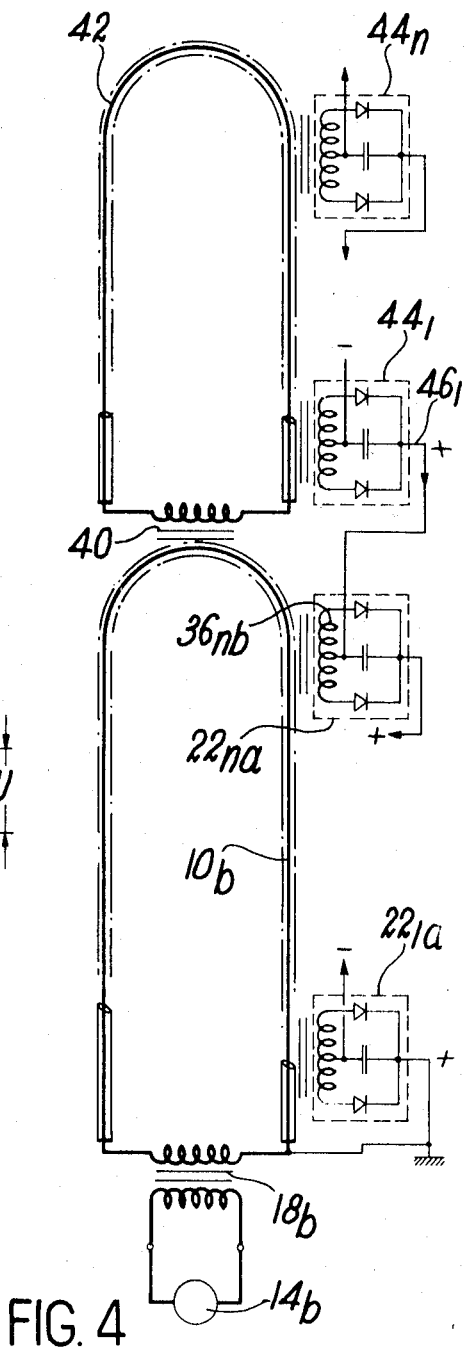

The arrangement which is illustrated in FIG 4 (in which the parts corresponding to those already described are designated by the same reference numerals to which is assigned the index $b$) is intended to provide a particularly high potential difference of the order of 1 megavolt, for example. Tow (or more) circuit arrangements of the type shown in FIG 1 are employed and mounted in cascade. There is again shown in FIG 4 a first loop which constitutes a transfer winding $10_b$ supplied from a source $14_b$ which is coupled to the loop by means of a magnetic circuit $18_b$. There are associated with the winding $10_b$ cells $22_q, .... 22_{na}$, the outputs of which are placed in series so as to provide between the output $36_{na}$ and ground a potential difference $U = nu$.

The loop which constitutes the transfer winding $10_b$ is inductively couples by means of a closed magnetic circuit 40 to a second loop 42 which can be identical with the first. Cells $44_1, .... 44_n$ which are equal in number and similar in design to that of the cells $22_{1b}, .... 22_{nb}$ are associated with said second loop. All the cells are placed in series, the output $36_{nb}$ being coupled to the input $46_1$ of the cell $44_1$: there is thus obtained a potential difference $2U$.

It can be noted by way of indication that each cell can be designed to provide a potential difference of the order of 60 kv. There is no reason to prevent much lower values from being adopted such as 5 kv., for example, but it would in that case be necessary to increase the number of cells in order to obtain a given total potential difference $U$.

Figure 5:
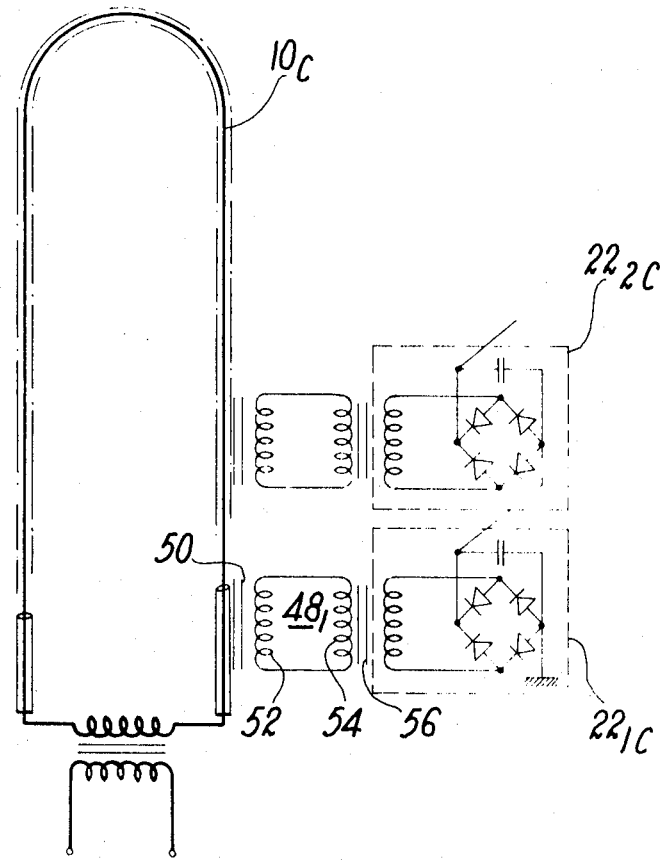
FIG 5 is a diagram representing a device according to another alternative embodiment of the invention.

It is also possible to employ the arrangement which is illustrated in FIG 5 wherein each cell is no longer coupled directly to the loop $10_c$ which constitutes the transfer winding and is supplied through an intermediate circuit such as the circuit $48_1$ in the case of the cell $22_{1c}$.

This arrangement has one advantage in that it leads to the use of magnetic circuits having a total weight which is smaller than the weight of the circuits of FIG 3. In fact, the magnetic circuit 50 can be limited to a ring formed by a spirally-wound strip of sheet metal, which constitutes a highly favorable arrangement from the point of view of losses. The winding 52 is then reduced to a small number of turns of insulated wire (e.g. 10 or a few multiples of 10). The absence of any airgap reduces magnetic flux losses to a very small value. As to the circuit $48_1$, this latter may be coupled with the load circuit by means of a transformer of entirely conventional type and therefore of low cost. In an actual construction evolved from one embodiment, a transformer was specifically designed to deliver at the secondary an effective RMS alternating current voltage of 10 kv. starting from an effective RMS value of 100 volts at the primary. The arrangement of FIG 5 makes it possible to place the rectifier cell (cell $22_{1c}$, for example) at an even greater distance from the loop $10_c$ simply at the price of lengthening of the coupling conductors between the windings 53 and 54. Depending on the frequency of the voltage supplied to the loop $10_c$, the magnetic circuits 50 and 52 can be fabricated from electrically conductive magnetic material (sheet metal formed of ferrosilicon alloy, for example) or from insulating material (such as the ferrites).

The devices illustrated in FIGS. 1 to 5 are fed by a single-phase alternating current source. In order that the undulation rate of the DC voltage that it delivers be acceptable, the rectifiers must be associated with filters including condensators. Such condensators adapted to be subjected to high voltages are bulky, costly and their reliability is unsatisfactory.

For a number of applications, a substantial rate of undulation of the DC high voltage may be acceptable: such applications include for instance industrial irradiators. For this type of applications it is possible to use the device of FIG 5, which provides a relatively low rate of undulation. The embodiment of FIG 5 includes a three-phase alternating current source and full-wave rectifiers which make it possible to dispense with the filters of the embodiments shown in FIGS. 1 to 5.

Figure 6:
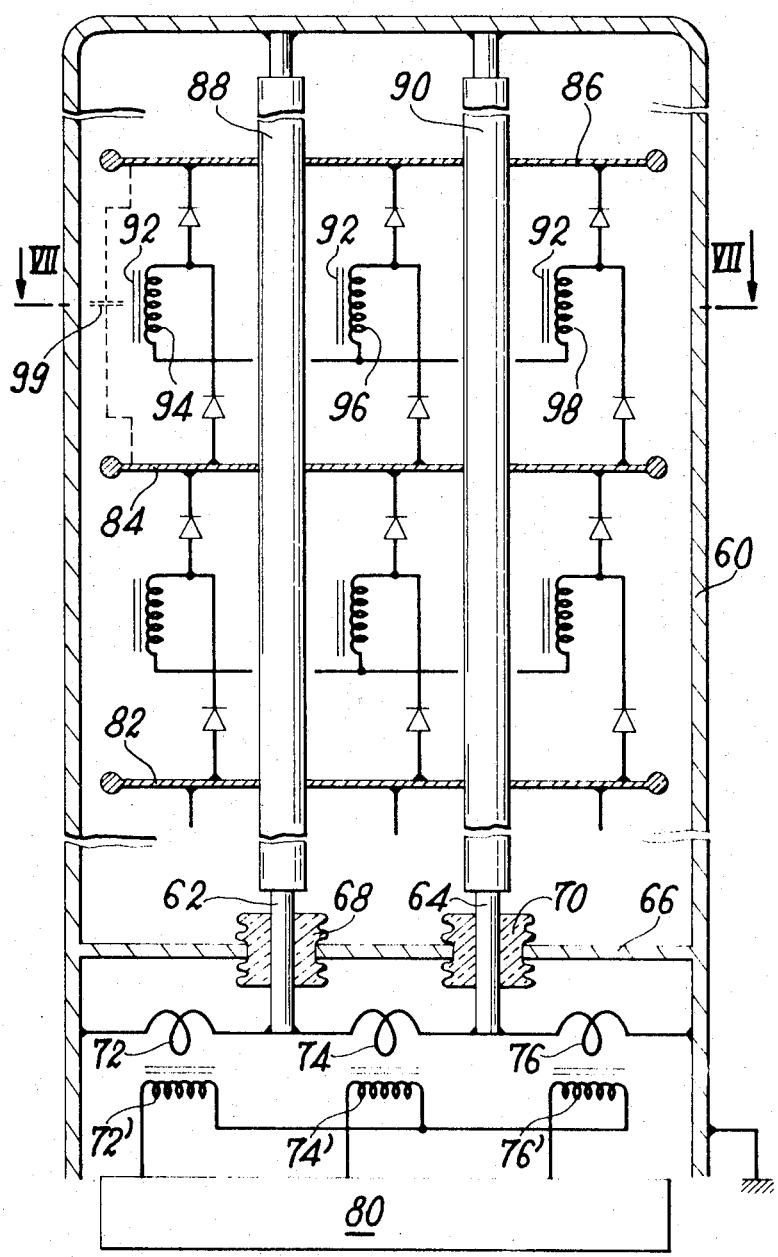
FIG 6 is a diagram of another embodiment of the invention which makes use of a three-phase supply.

The embodiment illustrated in FIG 6 comprises a bell housing 60 of electrically conductive material connected to the ground.

In FIG 6, the bell housing 60 is leak-tight and filled with pressurized insulating gas: it is possible in particular to employ for this purpose sulfur hexafluoride under a pressure of a few bars. The metallic bell housing 60 is grounded and constitutes a return conductor for the conductive transfer loops. In the case of the three-phase circuit which is illustrated in this figure, the loops comprise two conductive rods 62 and 64 of copper, for example. The upper extremity of each rod is secured to the top portion of the bell housing and is therefore connected to ground.

Figure 8:
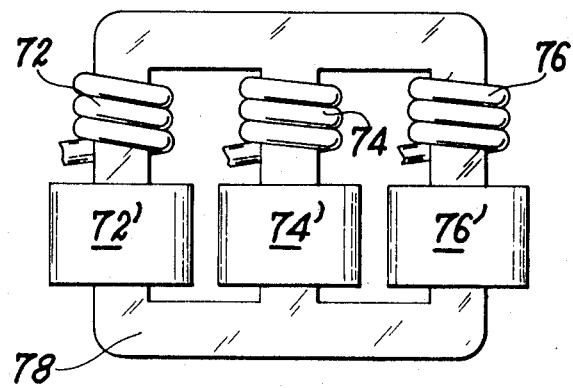
FIG 8 is a diagrammatic representation of the coupling circuit between the three-phase supply and the loops of the device of FIG 6.

The lower extremities of the conductive rods 62 and 64 traverse the base 66 of the bell housing through insulators 68 and 70 which are intended to withstand only the amplitude of the alternating current voltage produced between the bell housing and the loop by the supply. The loops are inductively coupled to the supply which is advantageously constituted by a variable transformer 80 such as a transformer of the type which is commonly referred to as a "Variac" auto-transformer. Coupling is carried out be means of three windings 72, 74 and 76 each consisting of a few turns of thick insulated wire which are wound on the arms of a three-phase magnetic circuit 78. It is possible in particular to adopt the arrangement illustrated diagrammatically in FIG 8 in which the same arms of the magnetic circuit 78 carry primary windings 72′, 74′ and 76′ which are supplied by the transformer 80. There are uniformly spaced in the bell housing horizontal equipotential plates, only the three last plates being shown, namely those which are designated by the reference numerals 82, 84 and 86. In the case of a generator which is intended to deliver a direct current high voltage of 300 kv., it is possible to utilize 12 plates, for example, the potential difference between two successive plates being 25 kv.

The rods 62 and 64 traverse the equipotential plates and are naturally provided with insulating sheaths 88 and 90 which are intended to withstand the potential difference between the loops (the potential of which is close to that of ground) and the maximum voltage plate 86. In the case of a 300 kv. generator in which the bell housing is filled with sulfur hexafluoride under a pressure of 5 bars, it is necessary to provide a distance of at least 3 cm. between the edges of the plates and the bell housing and to extend the insulator to a minimum distance of 25 cm. from the top plate 86 in order to prevent high-voltage "creep" which would generate sparkover. It should be noted that it will usually prove necessary to provide rods 62 and 64 which have a large cross-sectional area by reason of the fact that the loops transmit the necessary power at a very low alternating current voltage. Thus, in the case of a generator which produces 20 ma. at a voltage of 300 kv. and the windings 72, 74 and 76 of which are made up of a few turns, the rods 62 and 64 will have to transmit a current of several hundred amps.

Figure 7:
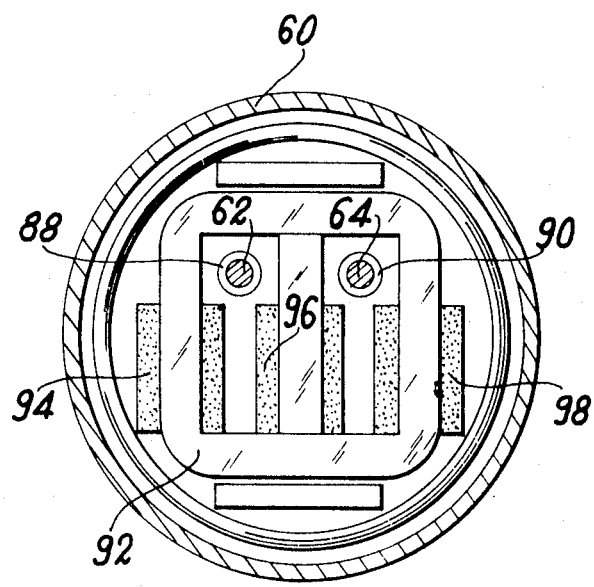
FIG 7 is a plan view of the embodiment of FIG 6 at the level of the line VII–VII of FIG 6.

The cells which are intended to provide the potential differences between successive plates are identical and only the cell which is mounted between the plates 84 and 86 will now be described. This cell is composed of an inductive coupling magnetic circuit 92 which (as shown diagrammatically in FIG 7) can consist of a frame of ferromagnetic material with three arms. The rods 62 and 64 are each adapted to pass between two arms of the frame 92. There are wound on said arms three coils 94, 96 and 98 which supply a three-phase rectifier A rectifier which is specially suited to this purpose is the so-called "Graetz bridge" which, by rectifying the two half-waves, delivers a direct current voltage having extreme values in the ratio of 3 to 1.5. It will naturally be possible to associate with this rectifier a filter which is represented diagrammatically in FIG 6 by a capacitor 99. This is a complication which will not usually prove necessary in view of the low ripple ratio of the high voltage produced.

A device actually constructed according to the foregoing data was contained within a bell housing 1 m. in height and 300 mm. in diameter. The high-voltage output consisted of an insulated cable which passed out of the bell housing at the top face of this latter through an insulator of substantial length (not shown in the drawings).

It is apparent that the device hereinabove described delivers a high voltage having a low hum or ripple ratio without thereby entailing the need to provide the rectifiers with filters. The maximum potential difference which can be developed between two plates is no longer limited by the performance of the capacitors with which the filters are necessarily equipped.

The number of cells can therefore be considerably smaller than that which is necessary in the circuits according to FIGS. 1 to 5. A double economy is thus achieved on the one hand by reducing the number of cells and on the other hand by simplifying these latter as a result of elimination of filters. This arrangement should therefore be employed each time a not-negligible ripple ratio is permissible.

A particularly important application of the invention will now be described by way of example, namely an accelerator for negatively charged particles (electrons) which incorporates a device for producing a high potential difference in accordance with the invention.

The electron accelerator which is illustrated in FIGS. 9 and 10 comprises an evacuated tube made up of insulating rings 100 which are juxtaposed in a vacuum-tight assembly and separated by conductive equipotential plates 102 which are connected to annular electrodes $104_1, 104_2, ... 104_{12}$. The tube is provided at one end with a grounded electron ejection outlet 106 and at the other end with an electron gun 108 which can be of conventional design.

The accelerator comprises a loop 110 fitted with an insulating sheath 112, only a portion of which is shown in the diagram. Said insulating sheath is designed to withstand the maximum voltage which is developed between the loop supply source and the load circuit.

The electrodes $104_1, .... 104_{12}$ are supplied with direct current voltage of progressively increasing value from ground to the high-voltage terminal 114 by cells $116_1, .... 116_{12}$ of the same type as those described in the foregoing and the magnetic circuits of which are traversed by the loop 110. The alternating current supply 118 can be provided by an alternator driven by an electric motor or by a moving-part supply which receives power from the mains at 50 or 60 c/s. The frequency of the supply 118 is comprised between a few cycles and several thousand cycles per second.

Depending on whether the output required from the accelerator is either low or high, the alternating current voltage to be supplied to the loop 110 varies by a fraction of 1 volt to several tens of volts; the current within the loop can exceed 100 amps. The loop may be either solid or hollow and, in the latter case, can carry a flow of liquid or gas in order to assist cooling of the loop (said liquid can be at a very low temperature in order to endow the loop with superconducting properties).

The alternating current flowing through the loop 110 which constitutes the primary of each cell $116_1, .... 116_{12}$ induces within the closed magnetic circuit which is associated therewith a magnetic flux having the same frequency which passes through a secondary 7 (shown in FIG 6) made up of a few hundred to a few thousand turns of wire in order than an alternating current voltage of a few thousand to a few tens of thousands of volts may be produced at its terminals under normal operating conditions according to the arrangement which is illustrated in FIG 1.

Resistors (not shown in the figures) can be placed at the terminals of the cells $116_1, .... 116_{12}$ and thus constitute a resistive chain which is placed between the very high voltage and ground.

The acceleration high voltage and the means for distributing the potential along the stack being thus obtained, the low voltages which are necessary for the operation of the electron gun can be produced by employing for this purpose an additional magnetic circuit which is placed within the high-voltage terminal 18 around the single induction loop but it is not possible in that case to carry out separate adjustments. It is preferable to make use of an insulating transformer as described in the patent application filed by the present applicant on the same as the present application in respect of "Insulating transformer."

A large number of alternative forms can be devised for the embodiment of FIGS. 9 and 10. For example, the cells $116_1, .... 116_{12}$ can be embedded in the mass of rings or plates 120 of epoxy resin and are so designed that, by stacking them in alternate relation with conducting electrodes, the cells themselves constitute the hollow accelerator tube in which a high vacuum is maintained (FIG 11).

In the embodiment just referred to, the rings are provided with a central hole 124 of large diameter for the passage of the electron beam and two lateral holes 126 of smaller diameter through which the loop is intended to pass (as shown in FIG 11). One cell can be fitted around each of said lateral holes, two cells or modules per ring being thus provided in series.

Since magnetic flux losses are negligible as has been stated earlier, no perturbing magnetic field need be expected at the level of the electron beam. It should be pointed out that, even if such fields were present, their sum on the axis would be zero (since currents flow in opposite directions through the two sections of the loop which pass through the two lateral holes) when the apparatus has two symmetrical series of magnetic circuits, that is to say one circuit on each loop section.

In order to prevent fluctuations in value of the high voltage which could result from fluctuations of the load (for example, accidental variations or variations caused by the stream of accelerated particles), a control unit 128 is intended to modify the power delivered by the supply source 118 or by the supply transformer which may replace said source. Said control unit is in turn controlled by a low voltage which is taken from the chain of resistors connected to the terminals of the modules as a fraction of the total high voltage at the terminals of a resistor 130 which may be duplicated if necessary by a capacitor 132 (as shown in FIG 9).

I claim:

1. A device for generating a DC high voltage, comprising a transfer coil, a low-voltage AC current source in operative relation with said coil, a plurality of cells each having an individual magnetic core inductively coupled with an insulated portion of said transfer coil, a secondary winding carried by said core and a rectifier circuit fed by said secondary winding, the outputs of all said rectifiers being in series aiding relation.

2. A device for generating a DC high voltage, comprising a transfer coil, an AC current source in operative relation with said coil, a plurality of cells each having a secondary winding inductively coupled with said transfer coil and a rectifier circuit fed by said secondary winding, the outputs of all said rectifiers being in series aiding relation wherein the transfer coil consists of one closed loop and said source is coupled with said loop by a closed magnetic circuit which is traversed once by said loop, and wherein each of said cells comprises a closed magnetic circuit which is traversed once by said loop, and wherein each of said cells comprises a closed magnetic circuit each provided with one of said secondary windings, said loop being at an electrical potential with respect to the source which is substantially half said DC high voltage.

3. A device for generating a DC high voltage, comprising a transfer coil, an AC current source in operative relation with said coil, a plurality of cells each having a secondary winding inductively coupled with said transfer coil and a rectifier circuit fed by said secondary winding, the outputs of all said rectifiers being in series aiding relation wherein said transfer coil consists of a closed loop whose ends are connected to a coupling winding inductively associated with said source, said loop being at the DC potential of said source and being provided with an electrical insulation at least equal to the insulation necessary for supporting said DC high voltage.

4. Device according to claim 1, wherein each of said cores completely encircles said transfer coil.

5. Device according to claim 2, wherein said transfer loop is connected to the output of the rectifier of one of said cells.

6. Device according to claim 1, having a frequency converter between said source and said transfer coil.

7. Device according to claim 1, wherein each of said rectifier circuits includes an electrical filter.

8. Device according to claim 3, wherein said source is a multiphase. AC source and each of said cells is associated with several transfer loops corresponding to the several phases.

9. Device according to claim 1, constituting the high-voltage DC supply to an electrically loaded particle accelerator, wherein said loop is within a closed leak-tight vessel and traverses a plurality of magnetic circuits whose secondary windings feed a plurality of cells in series adding relation providing said DC high voltage between the high-voltage terminal of the accelerator and the ground.

10. Device according to claim 9, having a supplementary cell without a rectifier, operatively associated with said loop and feeding an electron gun of said accelerator.

11. Device according to claim 10, having a target adapted to receive electrically charged particles for producing X-rays.

12. Device according to claim 9, herein said vessel is the accelerator vessel and consists of a stack of electrically insulating rings each locating a cell, said cell feeding an accelerating electrode carried by the ring.